E. H. SHERBONDY.
CONTROL MECHANISM.
APPLICATION FILED APR. 11, 1921.

1,415,200.

Patented May 9, 1922.
3 SHEETS—SHEET 1.

Inventor
Earl H. Sherbondy

By Whittemore Hulbert Whittemore
+Belknap                Attorneys

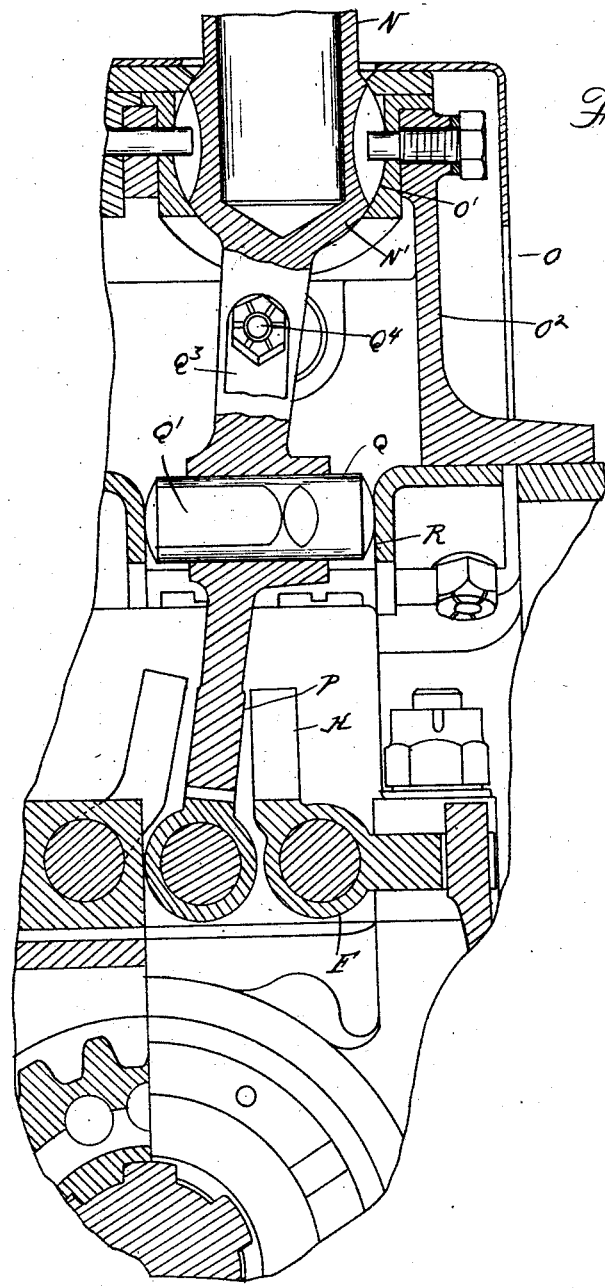

E. H. SHERBONDY.
CONTROL MECHANISM.
APPLICATION FILED APR. 11, 1921.
1,415,200.
Patented May 9, 1922.
3 SHEETS—SHEET 3.
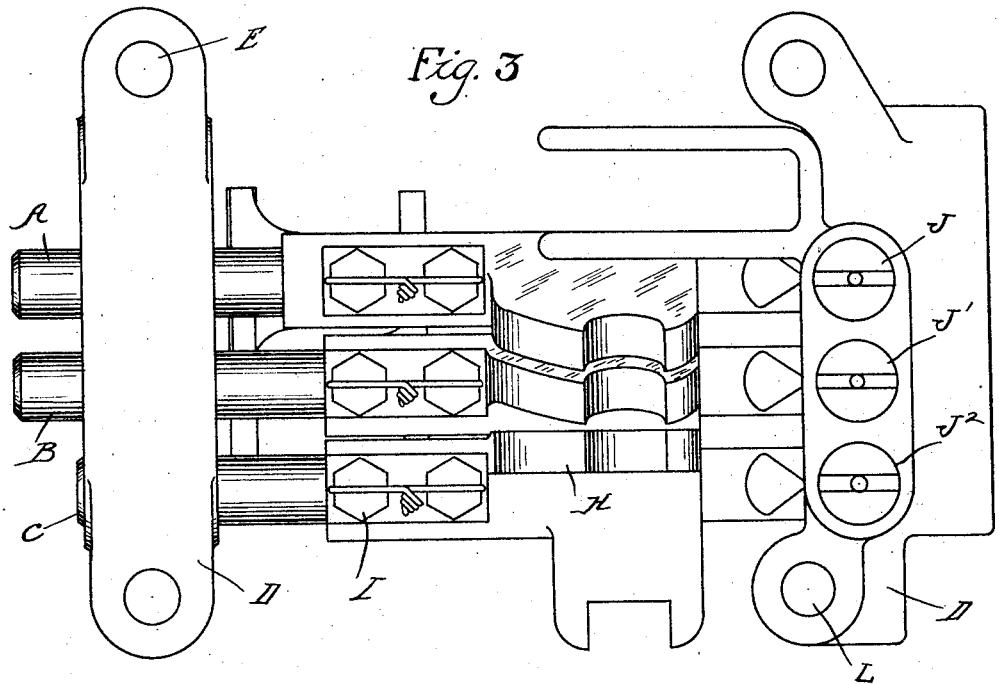
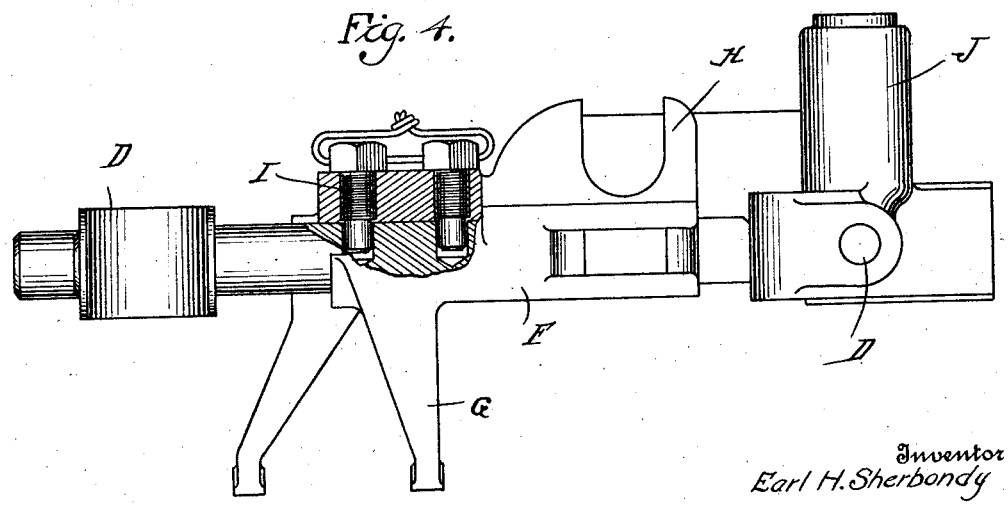
Inventor
Earl H. Sherbondy

UNITED STATES PATENT OFFICE.

EARL H. SHERBONDY, OF DETROIT, MICHIGAN, ASSIGNOR TO SIDNEY D. WALDON, OF DETROIT, MICHIGAN.

CONTROL MECHANISM.

1,415,200. Specification of Letters Patent. Patented May 9, 1922.

Application filed April 11, 1921. Serial No. 460,423.

*To all whom it may concern:*

Be it known that I, EARL H. SHERBONDY, a citizen of the United States of America, residing at Detroit, in the county of Wayne and State of Michigan, have invented certain new and useful Improvements in Control Mechanism, of which the following is a specification, reference being had therein to the accompanying drawings.

The invention relates to control mechanisms such as are used on motor vehicles for shifting the gears, applying the brake, etc., and the invention consists in various features of construction as hereinafter set forth.

In the drawings:

Figure 2 is a cross-section thereof;

Figures 3, 4 and 5 are respectively a plan view, sectional side elevation and sectional end elevation of the slides for the gear shift;

Figures 6, 7 and 8 are side elevations of the pins.

Figure 1:
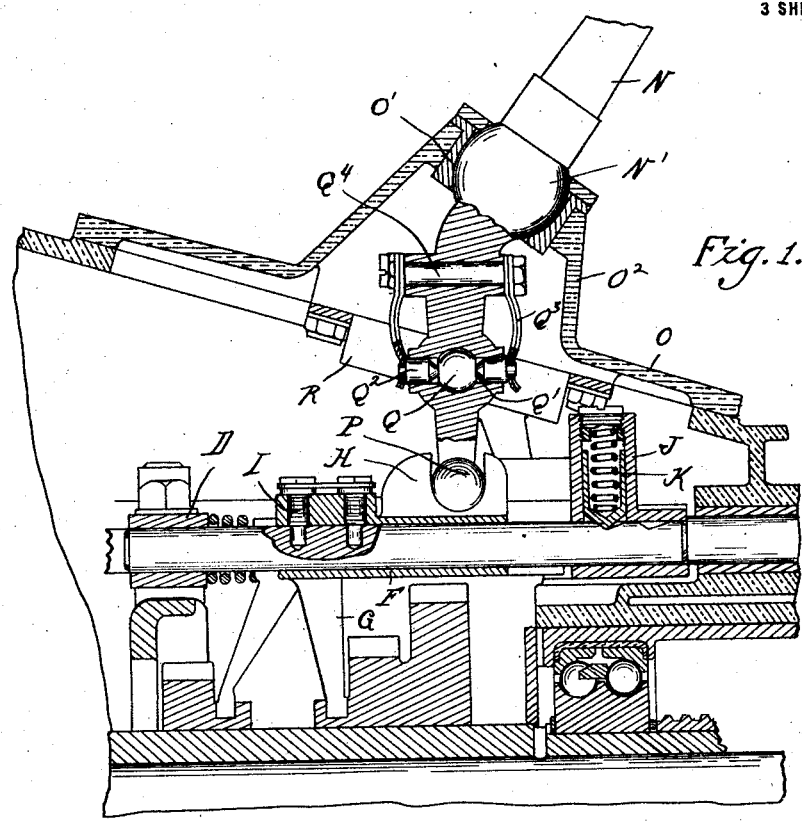
Figure 1 is a longitudinal section through the control, showing the same as mounted on the housing of the transmission gearing.
Figure 5:
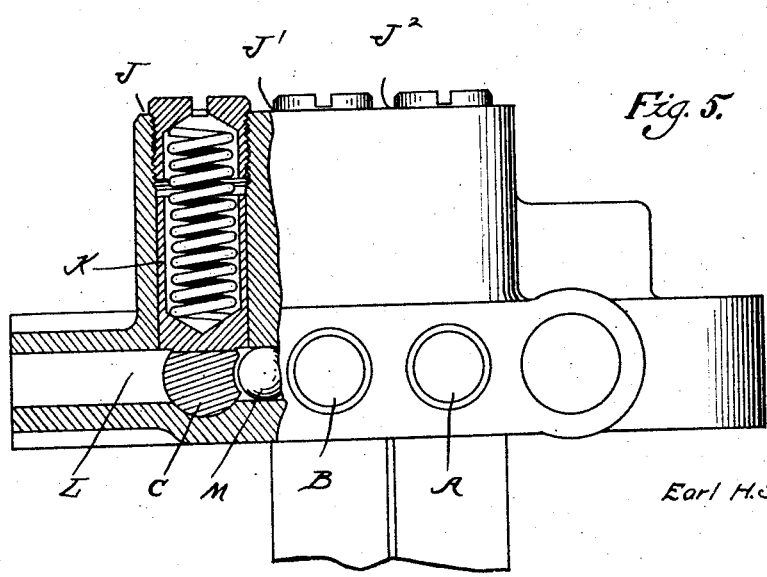

My improved control mechanism is of that type in which a universally pivoted lever is laterally adjustable when in neutral position into alternative engagement with a plurality of notched slides or gear shifters and is then longitudinally adjustable for the operation of the shifter with which it is engaged. One of the features of the invention is the construction of the slides or shifters and the manner of mounting the same. Another feature is the means for determining the selective engagement of the control lever with various slides or shifters and the manner of mounting said lever to permit of readily removing and replacing the same.

In detail, A, B and C are three slides or gear shifters arranged in parallelism and slidably mounted in bearings in the cross bars D, which are mounted on studs E rising from the frame of the transmission gearing. Each of the shifters is preferably formed of a plane cylindrical bar for engaging the bearings and a member F sleeved thereon having the depending shifter fork G and the upwardly extending notched lug H for engagement with the control lever. The members F are locked to the rods by suitable means, such as the screws or pins I, and are accurately located by jig work. One of the cross bars D has formed thereon a series of pockets J, J' and $J^2$ for the reception of spring-pressed plungers K for engaging notches in the rods A, B and C to yieldably hold the same in the different positions of adjustment. The bar D is also transversely bored at L and balls M, or equivalent means, are placed in this bore, these being of greater diameter than the space between the rods and alternatively engaging notches therein to lock one of the rods when the adjacent one is shifted from neutral. Thus all of the shifters A, B and C are substantially the same in construction and differ only in the members F thereof.

The control lever N is mounted in the cover O of the transmission gearing housing, being provided with the ball N' for engaging the spherical socket O' in an upwardly-extending portion $O^2$ of the cover. The portion of the lever N which extends within the housing is provided at its free end with a knob P for engaging the notches in the lugs H, this knob being of a width corresponding to the width of the lock and shiftable laterally from one lug to another. To determine the positions for engagement with the respective lugs, the lever N is transversely bored to receive a slidable pin Q, the ends of which are rounded and abut against parallel guide plates R on opposite sides of the lever and mounted on the cover O. The pin Q is provided with one or more shoulders Q' for engagement with latch dogs $Q^2$ which as shown are arranged in recesses upon opposite sides of the lever and are pressed inward by springs $Q^3$ secured by the bolts $Q^4$. The arrangement is such that when the lever N is rocked laterally, the engagement of the dogs $Q^2$ with the shoulders Q' can be felt so that the operator will know when the lever is in proper registration with any one of the slides. As shown in Figure 6, the pin Q has three notches therein for each of the three positions of the lever N, in Figure 7 the pin has only two notches, and Figure 8 only one. In the latter case the notch or shoulder Q' is used merely for determining registration with the intermediate slide, while registration with the slides on opposite sides thereof is determined by contact of the lever with the guide plates R. The angular movement of the lever N will not be interfered with by the pin Q, as the rounded ends thereof will maintain contact with the plates R in every position of adjustment.

In assembling the structure the members F may be quickly attached to their rods and engaged with the bearings in the cross bars D. These cross bars may then be registered with the studs E and secured in position thereon, which will engage the shifter fork G with the respective gears to be shifted. The cover plate O with the lever N mounted therein may then be placed upon the housing of the transmission gearing, which will bring the knob P into engagement with the notched lugs H. When the cover plate is secured, the lever N may be shifted laterally to engage any one of the slides and by then actuating it longitudinally the desired shift of the gears is effected. Where the three slides are employed, this will provide for four forward speeds, as well as one or more reverse speeds, and it is obvious that a larger number of slides could be used if desired.

What I claim as my invention is:

1. A control mechanism comprising a universally pivoted lever, a series of more than two parallelly arranged shifters with which said lever is alternatively engageable by a lateral movement thereof, and means for indicating by feeding the registration of said lever with one or more of the shifters.

2. A control mechanism comprising a universally pivoted lever, a series of more than two parallelly arranged shifters having notched portions for the alternative engagement of said lever, and means operable on the lateral shifting of said lever for determining registration thereof with the selected shifter.

3. In a control mechanism, the combination with a series of shifters, of a universally pivoted control lever arranged for alternative engagement with said shifters, and means mounted on the control lever for determining registration thereof with the respective shifters.

4. In a control mechanism, the combination with a series of shifter slides, of a universally pivoted control lever for alternative engagement with said slides, means for determining the registration of said lever with the respective slides comprising a pin slidably engaging said lever and extending transversely thereof, a guide extending longitudinally of said lever for holding said pin from transverse movement while permitting longitudinal movement thereof with said lever, and means cooperating with said pin for indicating the position of the lever relative thereto.

5. A control mechanism comprising a series of parallelly arranged shifters, a casing in which said shifters are housed, a cover for said casing, a lever universally pivotally connected to said cover and movable transversely into alternative engagement with said shifters and longitudinally for the operation of said shifters, and means also mounted on said housing for determining the transverse position of said lever and therefore the registration thereof with the respective slides.

6. In a control mechanism, the combination with a series of parallelly arranged shifters and a housing in which they are enclosed, of a detachable cover for said housing, a lever universally pivoted in said cover to be removable and replaceable, said lever being transversely movable into alternative engagement with the respective shifters, and means for determining registration of said lever with the respective shifters comprising parallel guides mounted on said cover, a pin transversely slidably engaging said lever and having its ends in contact with said guides, and means on said lever yieldably engaging said pin to indicate the movement thereof.

In testimony whereof I affix my signature.

EARL H. SHERBONDY.